Oct. 28, 1969   I. J. CARTER ET AL   3,474,669
ALIGNING MEANS FOR PITOT-STATIC PROBE
Filed July 11, 1967                                   2 Sheets-Sheet 1

INVENTORS
IVOR JOHN CARTER
ROBERT JAMES JELLEY
BY
ATTORNEY

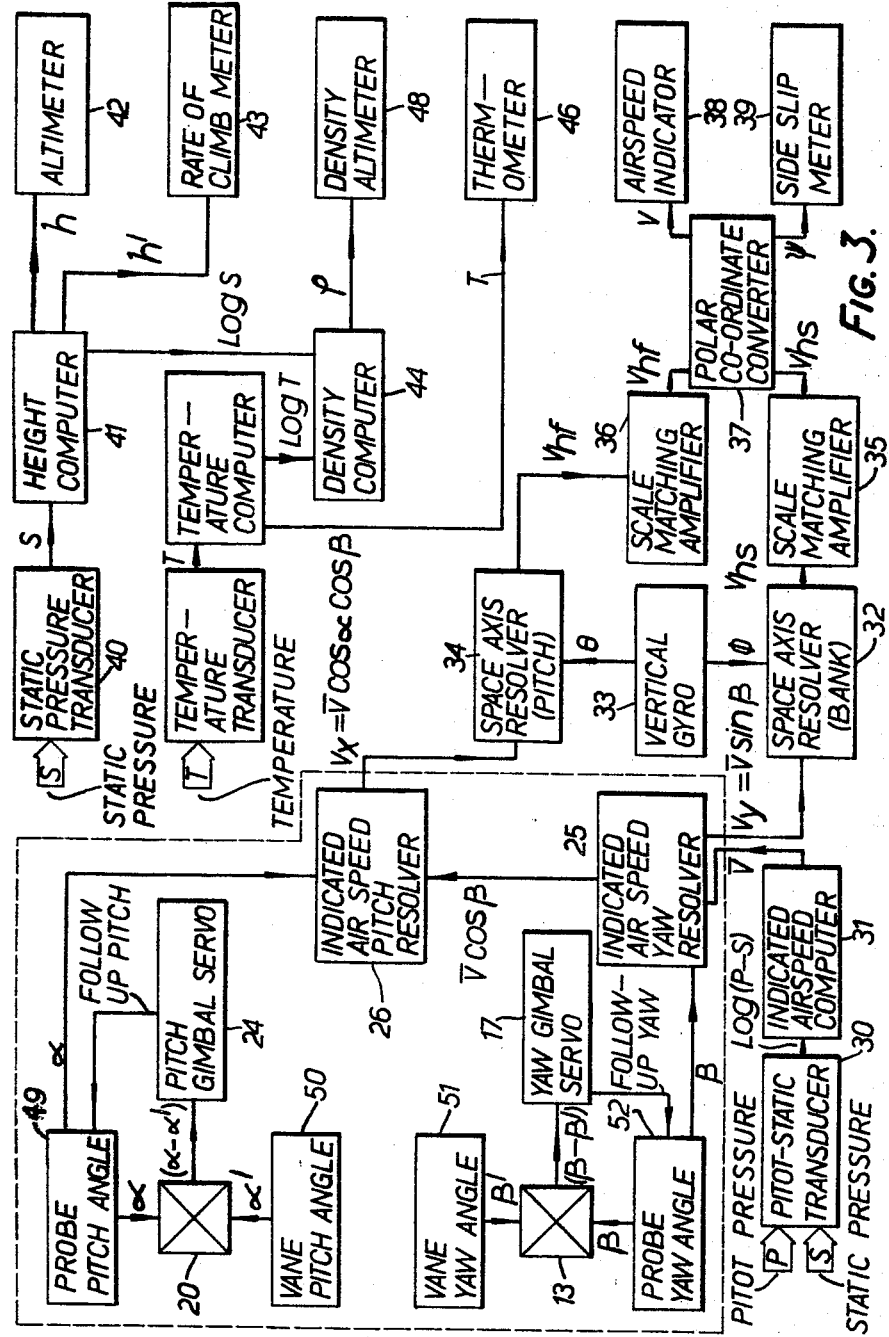

United States Patent Office 3,474,669
Patented Oct. 28, 1969

3,474,669
ALIGNING MEANS FOR PITOT-STATIC PROBE
Ivor John Carter and Robert J. Jelley, London, England, assignors to Elliott Brothers (London) Limited, London, England, a British company
Filed July 11, 1967, Ser. No. 652,605
Claims priority, application Great Britain, July 21, 1966, 32,912/66
Int. Cl. G01c 21/00; G01w 1/02; G01f 1/00
U.S. Cl. 73—178                                    10 Claims

ABSTRACT OF THE DISCLOSURE

A swiveling pitot-static probe has its longitudinal axis aligned in the direction of an incident airstream by control means responsive to vanes sensing the direction of the incident airstream.

---

The invention relates to air-responsive apparatus including a pitot-static probe and for use on aircraft (including helicopters).

The present invention provides air-responsive apparatus for an aircraft, comprising a swivelling pitot-static probe, sensing means arranged to respond to the direction of an incident air stream, and control means arranged to control the orientation of said pitot-static probe in two mutually perpendicular planes in response to said sensing means.

The present invention further provides air-responsive apparatus for an aircraft, comprising a first vane pivotable about a first axis, a second vane pivotable about a second axis, said first and second axes being mutually inclined, an adjustable pitot-static probe, detection means operative to detect the angle of said first vane with respect to the longitudinal axis of said pitot-static probe and operative to detect the angle of said second vane with respect to the longitudinal axis of said pitot-static probe, and servo means for controlling said pitot-static probe in response to said detection means whereby to tend to maintain the magnitude of said angles constant.

Figure 1:
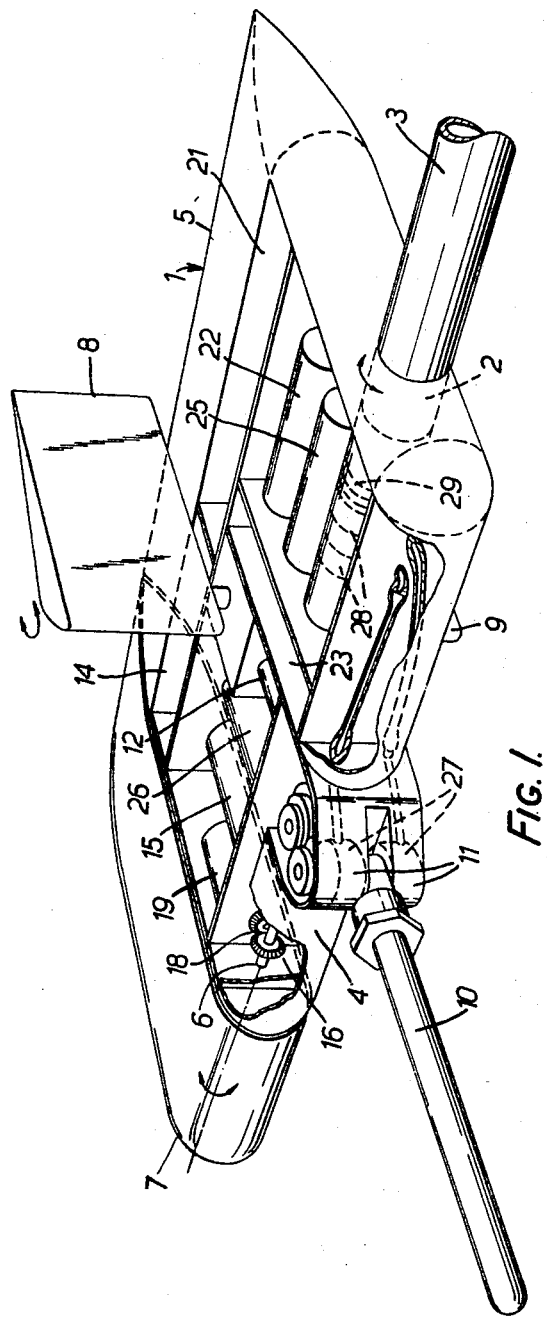
Figure 2:
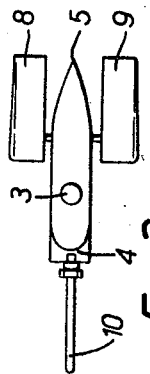

Apparatus embodying the invention for use on a helicopter and including a pitot-static probe and means responsive to the output thereof will now be described, by way of example, with reference to the accompanying diagrammatic drawings in which:

FIGURE 1 is a part cut away perspective view of part of the apparatus incorporating a pitot-static probe, FIGURE 2 is a side elevation of FIGURE 1; and FIGURE 3 is a block diagram of an air data system in the apparatus and for use with the pitot-static probe shown in FIGURE 1.

In FIGURES 1 and 2 the probe control assembly 1 is pivotally mounted, in pitch bearings 2, to a fixed support tube 3. The outer surface of the control assembly is streamlined in form, and has a leading edge 4 and a trailing edge 5. The leading edge 4 and the trailing edge 5 are in a plane containing, and are substantially parallel to, the axis of rotation of the pitch bearings 2, the axis being closer to the leading edge 4 than it is to the trailing edge 5.

At the end of the control assembly 1 remote from the support tube 3 and pivotally mounted to the control assembly 1, in a pitch vane bearing 6, is a pitch vane 7. The pitch vane 7 is in a plane containing the axis of rotation of the pitch vane bearing 6 and this axis is coaxial with the axis of rotation of the pitch bearing 2.

Two yaw vanes 8 and 9 are pivotally mounted, in yaw vane bearings (not shown), to the control assembly 1. The yaw vanes 8 and 9 are in a plane containing the axis of rotation of the yaw vane bearings and are constrained to act together as a single yaw vane. The axis of rotation of the yaw vane bearings is normal to the plane containing the leading edge 4 and the trailing edge 5 of the control assembly 1. The yaw vane 8 is similar in size and shape to the yaw vane 9 and the yaw vanes 8 and 9 are mounted on opposite sides of the control assembly 1.

Pivotally mounted in the region of and projecting from the leading edge 4 of the control assembly 1 is a pitot-static probe 10. The probe 10 can pivot over an angle of preferably ±70° from a mean position in the probe yaw bearings 11. The pivotal axis of the probe is parallel to the axis of rotation of the yaw vane bearings. The longitudinal axis of the probe 10 is normal to the axis of rotation of the probe yaw bearings 11.

The yaw vanes 8 and 9 and the probe 10 are both connected to a yaw differential 13 (see FIGURE 3). The output of the yaw differential indicates the difference between the yaw angle of the yaw vanes 8 and 9 detected by transducer 51 and the yaw angle of the probe 10 detected by transducer 52. A yaw pick-off 12 transduces the output of the yaw differential 13 into an electrical signal. The output of the yaw pick-off 12 is connected by way of a yaw servo amplifier 14 to a yaw servo motor tachometer 15. A yaw servo gearbox 16 is responsive to the motor tachometer 15 to control the yaw angle of the probe 10. The yaw pick-off 12, yaw servo amplifier 14, yaw servo motor transmitter 15, yaw servo gearbox 16 and a feedback loop from the yaw servo motor tachometer 15 to the yaw servo amplifier 14 together form a yaw gimbal servo 17 (see FIGURE 3).

The pitch vane 7 is connected by bevel gears 18 to a pitch pick-off 19 the output of which is an electrical signal which is a function of the difference between the pitch angle of the control assembly 1 relative to the support control assembly 1 and consequently of the probe 10. The pitch pick-off may be considered as transducing the output of a pitch differential 20 (see FIGURE 3). The two inputs of the pitch differential 20 are supplied, by transducers 50 and 49 which respectively provide the pitch angle of the vane 7 relative to the support tube 3 and the pitch angle of the control assembly 1 relative to the support tube 3.

The output of the pitch pick-off 19 is connected by way of a pitch servo amplifier 21 to a pitch servo motor and tachometer assembly 22 which is in turn connected to a pitch servo gearbox 23. The support tube 3 connected to the pitch servo gearbox 23 controls the pitch angle of the control assembly 1 and probe 10.

The pitch pick-off 19, pitch servo amplifier 21, pitch servo assembly 22, pitch servo gearbox 23 and a feedback loop from the tachometer output of the pitch servo assembly 22 to the pitch servo amplifier 21 together form a pitch gimbal servo 24 (see FIGURE 3).

An indicated airspeed yaw resolver 25 has an input which is the yaw angle of the probe relative to the support tube 3.

An indicated airspeed pitch resolver 26 has an input which is the pitch angle of the probe relative to the support tube 3.

The support tube 3 is rigidly attached to a helicopter airframe in a position which is between ¼ and ½ (preferably ⅓) of the rotor radius from the axis of rotation of the rotor and preferably between ¼ and ½ of the rotor radius below the rotor. The mean position of the longitudinal axis of the probe 10 is such that it extends parallel to the longitudinal axis of the helicopter and points in the forward direction of travel.

The dynamic (pitot) and static pressures from the probe 10 are transmitted by pneumatic sliprings 27 adjacent the yaw bearings 11, pneumatic sliprings 28 adjacent the pitch bearings 2 and the support tube 3 to the air data system (see FIGURE 3).

Electrical connections to the control assembly 1 are transmitted by electrical sliprings 29 and cables in the support tube 3 to electrical supply sources in the helicopter and to the air data computer.

The swivelling probe is capable of an angular movement in yaw of 140° and an angular movement in pitch of 360° both relative to the support tube 3 and consequently to the helicopter fuselage.

The yaw vanes 8 and 9 and the pitch vane 7 are sufficiently free to be capable of accurate alignment by the incident airstream, and the yaw gimbal servo 17 and pitch gimbal servo 24, in response to movement of the yaw and pitch vanes respectively, ensure that the longitudinal axis of the probe 10 is maintained substantially parallel with the direction of flow of the incident airstream within the limitations of angular movement.

In FIGURE 3 the units shown within the area having a dotted perimeter are contained within the control assembly while the remaining units are contained within the air data computer housed in the helicopter.

A pitot-static transducer 30 has inputs of pitot pressure and static pressure and an output connected to the input of an indicated airspeed computer 31 which in turn has an output connected to a first input of the indicated airspeed resolver 25, the second input to which is probe yaw angle. The indicated airspeed yaw resolver 25 has two outputs, one of which is connected to a first input of a space axis resolver (bank) 32 and the other of which is connected to a first input of an indicated airspeed pitch resolver 26. A second input of the space axis resolver (bank) 32 is connected to a first output of a vertical gyro 33. The second input of the indicated airspeed pitch resolver 26 is the probe pitch angle. The output of the indicated airspeed pitch resolver 26 is connected to a first input of a space axis resolver (pitch) 34, a second input of which is connected to a second output of the vertical gyro 33.

The outputs of the space axis resolvers 32 and 34 are connected by way of scaling amplifiers 35 and 36 to two inputs of a polar-co-ordinate converter 37. A first output of the converter 37 is connected to the input of an airspeed indicator 38 and a second output of the converter 37 is connected to the input of a sideslip indicator 39.

A static pressure transducer 40 has an input of static pressure and an output connected to the input of a height computer 41. The height computer 41 has three outputs a first one of which is connected to the input of an altimeter 42, a second one of which is connected to the input of a rate of climb meter 43 and the third one of which is connected to a first input of a density computer 44.

A temperature transducer 45 has an input of temperature and an output connected to an input of a temperature computer 47. A first output of the temperature computer 47 is connected to a second input of the density computer 44. A second output of the temperature computer 47 is connected to a thermometer 46. The output of the density computer 44 is connected to the input of a density altimeter 48.

The symbols used in FIGURE 3 have the following meanings:

$\alpha$ = probe pitch angle relative to helicopter fuselage,
$\alpha'$ = pitch vane pitch angle relative to helicopter fuselage,
$\beta$ = probe yaw angle relative to helicopter fuselage,
$\beta'$ = yaw vane yaw angle relative to helicopter fuselage,
$\Delta$ = total airspeed at probe,
P = pitot pressure (dynamic pressure),
S = static pressure,
T = absolute temperature,
$\theta$ = helicopter pitch angle,
$\phi$ = helicopter bank angle,
$V_x$ = forward velocity relative to helicopter fuselage,
$V_y$ = sideways velocity relative to helicopter fuselage,
$V_{hf}$ = horizontal velocity forwards,
$V_{hs}$ = horizontal velocity sideways,
$\rho$ = density,
$h$ = altitude,
$h'$ = rate of climb/descent,
V = total horizontal indicated airspeed,
$\psi$ = sideslip angle (direction of V to direction of $V_{hf}$)

In calculating the various aircraft performance parameters the following formulae are used:

$V_x = \overline{V} \cos \alpha \cos \beta$,
$V_y = \overline{V} \sin \beta$,
$V_{hf} = V_x \cos \theta, = \overline{V} \cos \alpha \cos \beta \cos \theta$,
$V_{hs} = V_y \cos \phi, = \overline{V} \sin \beta \cos \phi$, $$V = \sqrt{V_{hf}^2 + V_{hs}^2}$$

$$\psi = \tan^{-1} \left( \frac{V_{hs}}{V_{hf}} \right)$$

$\rho = K \frac{S}{T}$ where K is a constant.

In operation of the air data system the probe pitch angle $\alpha$ and vane pitch angle $\alpha'$ are fed into the pitch differential 20 the output $(\alpha - \alpha')$ of which is fed to the pitch gimbal servo 24. The pitch gimbal servo 24 has a follow-up pitch output arranged to control probe pitch angle to reduce $\alpha - \alpha'$ to zero. Probe pitch angle $\alpha$ is fed to the indicated airspeed pitch resolver 26. Probe yaw angle $\beta$ and vane yaw angle $\beta'$ are fed into the yaw differential 13 the output $(\beta - \beta')$ of which is fed to the yaw gimbal servo 17. The yaw gimbal servo 17 has a follow-up yaw output arranged to control probe yaw angle to reduce $\beta - \beta'$ to zero.

Probe yaw angle $\beta$ is fed to the indicated airspeed yaw resolver 25 together with total airspeed $\overline{V}$. To produce a signal representing total airspeed $\overline{V}$, pitot pressure P and static pressure S from the pitot static probe 10 are fed to the pitot static transducer 30 to be transduced into a signal representing log, P—S). This signal log (P—S) is fed to the indicated airspeed computer 31 the output of which provides total airspeed $\overline{V}$.

The indicated airspeed yaw resolver 25 resolves $\overline{V}$ and $\beta$ into two outputs ($\overline{V} \cos \beta$ and $V_y$) a first one of which ($\overline{V} \cos \beta$) is fed into the indicated airspeed pitch resolver 26 and a second one of which ($V_y$) is fed to the space axis resolver (bank) 32. Helicopter bank angle $\phi$ measured by the vertical gyro 33 is also fed to the space axis resolver (bank) 32 which resolves $V_y$ and $\phi$ to produce an output of horizontal velocity sideways ($V_{hs}$). The indicated airspeed pitch resolver 26 resolves $\alpha$ and $\overline{V} \cos \beta$ to produce an output forward velocity relative to the helicopter ($V_x$) which is fed to the space axis resolver (pitch) 34. Helicopter pitch angle ($\theta$) measured by the vertical gyro 33 is also fed to the space axis resolver (pitch) 34 which resolves $V_x$ and $\theta$ to produce an output of horizontal velocity forwards $V_{hf}$.

$V_{hs}$ is fed via the scale matching amplifier 35 to the polar co-ordinate converter 37 and $V_{hf}$ is fed via the scale matching amplifier 36 to polar co-ordinate converter 37.

The scale matching amplifiers 35 and 36 have gains arranged to ensure that the signals $V_{hf}$ and $V_{hs}$ both have the same relationship to actual velocity.

The polar co-ordinate converter 37 calculates the vector sum of $V_{hf}$ and $V_{hs}$ to obtain an output V which is fed to the airspeed indicator 38 and calculates the angle between $V_{hf}$ and V to obtain an output of sideslip angle $\psi$ which is fed to the sideslip meter 39.

The static pressure transducer 40 is supplied with static pressure S and transduces this input to provide an output signal representing S. This output is fed to the height computer 41 which computes the altitude $h$, the rate of change of altitude $h'$ and a logarithmic function of S (log S). Altitude $h$ is fed to the altimeter 42, $h'$ is fed to the rate of climb meter 43 and log S is fed to the density computer 44.

Temperature T is transduced by the temperature transducer 45 into an output signal representing a function of T. This output signal is fed to the temperature computer 47. The temperature computer 47 produces two outputs a first of which is T and is fed to the thermometer 46 and a second one of which is a logarithmic function of T (log T) and is fed to the density computer 44. The density computer 44 calculates density $\rho$ from log S, log T and a built in constant K and feeds $\rho$ to the density altimeter 48.

The control means controlling the pitot-static tube may be a mechanical linkage between the first and second vane means and the pitot-static probe or may include probe servo means arranged to control the pitot-static probe in pitch and yaw. The probe servo means is preferably electrically operated but may alternatively be pneumatically or hydraulically operated.

In an alternative arrangement a combination of mechanical linkage for control of the pitot-static probe in one of yaw and pitch and probe servo means for control of the pitot-static probe in the other of yaw and pitch may be used.

We claim:

1. Air responsive apparatus for an aircraft, comprising
 a pitot-static probe
 means mounting said pitot-static probe on the aircraft for pivotal movement about two mutually perpendicular axes,
 sensing means mounted on the aircraft by said mounting means and responsive to an incident airstream to provide an output in dependence on the angular incidence thereof,
 electrically operated position control servo means mounted on said aircraft by said mounting means, the servo means having an input and an output,
 means interconnecting the sensing means with the input of the servo means whereby the servo means receives the output from the sensing means and
 means interconnecting the output of the servo means with the pitot-static probe to pivot and probe about the two mutually perpendicular axes in response to the output of the sensing means.

2. Apparatus according to claim 1, wherein said servo means comprises
 means controlling the pitch and yaw of said pitot-static tube to maintain the longitudinal axis thereof coincident with the direction of flow of the incident airstream.

3. Apparatus according to claim 1, wherein said sensing means includes
 first vane means pivotally mounted on said aircraft by said mounting means and responsive to the flow of air in the direction of one of said mutually perpendicular axes, and
 second vane means pivotally mounted on said aircraft by said mounting means and responsive to the flow of air in the direction of the other of said mutually perpendicular axes etc.

4. Apparatus according to claim 3, wherein said first vane means includes a plurality of mechanically coupled vanes, each vane being mounted on said aircraft by said mounting means for pivotal movement in the direction of said one of said mutually perpendicular directions.

5. In air responsive apparatus, for an aircraft, responsive to an incident airstream therepast, the novel combination comprising
 a first vane mounted on said aircraft to be pivotal about a first axis,
 a second vane mounted on said aircraft to be pivotal about a second axis inclined to said first axis,
 a pitot-static probe adjustably mounted on the aircraft,
 detection means having first, second, third and fourth angle-responsive inputs and an output,
 means interconnecting the first vane with the first input, the second vane with the second input and the pitot-static probe with the third and fourth inputs whereby to provide outputs from the detection means representative of the angles that said first and second vanes make with respect to the longitudinal axis of said pitot-static probe,
 servo means having an input and an output, and
 means connecting the input of said servo means to the output of said detection means and connecting the output of said servo means to the pitot-static probe whereby to pivot said pitot-static probe about axes parallel to said first and second axes in dependence upon the output of said detection means so as to maintain substantially constant the angles that said pitot-static probe makes with the first and second vanes.

6. Apparatus according to claim 5 wherein said first and second axes comprise the pitch and yaw axes of the aircraft and said detection means includes
 a first transducer responsive to the movement of the first vane and connected to the first input of the detection means to provide a first electrical signal representative of the angle of pitch,
 a second transducer responsive to the movement of the second vane and connected to the second input of the detection means to provide a second electrical signal representative of the angle of yaw,
 a third transducer responsive to the movement of the pitot-static probe and connected to the third input of the detection means to provide a third electrical signal representative of the angle of pitch of the pitot-static probe,
 a fourth transducer responsive to the movement of the pitot-static probe and connected to the fourth input of the detection means to provide a fourth electrical signal representative of the angle of yaw of the pitot-static probe,
 first comparison means providing a first comparison output representative of the difference between the first and third signals, and
 second comparison means providing a second comparison output representative of the difference between said second and fourth signals,
 said servo means being responsive to said first and second comparison outputs to maintain substantially at zero the angles that said pitot-static probe makes with the first and second vanes.

7. Apparatus according to claim 9, including an airspeed indicator,
 means supplying the pressures in the pitot-static probe to the airspeed indicator whereby the indicator indicates the airspeed of the aircraft in dependence thereon,
 a side slip indicator, and
 means supplying the pressures in the pitot-static probe to the side slip indicator and supplying the first and second electrical signals to the side slip indicator whereby the side slip indicator indicates side slip of the arcraft in response to the pressures in and the angular position of the pitot-static probe.

8. Apparatus according to claim 5, wherein said aircraft comprises a helicopter.

9. In air responsive apparatus, for a helicopter, responsive to an incident airstream therepast, the novel combination comprising
 a first vane mounted on said aircraft to be pivotal about a first axis in dependence on the airstream,
 a second vane mounted on said aircraft to be pivotal about a second axis, inclined to the first axis, in dependence on the airstream,
 a pitot-static probe, means adjustably mounting said pitot-static probe on the helicopter at between ¼ and ½ of the helicopter rotor radius from the axis of rotation of the rotor and between ¼ and ½ of the helicopter rotor radius below the rotor so that the pitot-static probe is pivotal about two axes respectively parallel to the first and second axes, and means controlling the movement of the pitot-static probe in dependence on the movement of the two vanes whereby to maintain substantially constant the angles that said pitot-static probe makes with the first and second vanes.

10. Apparatus according to claim 9, including means mounted on the helicopter for limiting the movement of said pitot-static probe in yaw through an angle of ±70° from a means position in which it is parallel to the longitudinal axis of the helicopter.

References Cited

UNITED STATES PATENTS

| | | | |
|---|---|---|---|
| 2,554,634 | 5/1951 | Paine et al. | 73—212 |
| 2,662,402 | 12/1953 | Ince et al. | 73—212 XR |
| 2,936,617 | 5/1960 | Beebe | 73—181 XR |
| 3,228,247 | 1/1966 | Hansen et al. | 73—182 XR |
| 3,347,095 | 10/1967 | Strong et al. | 73—178 |

DONALD O. WOODIEL, Primary Examiner

U.S. Cl. X.R.

73—180, 182, 189, 212